United States Patent [19]

Wildern, IV et al.

[11] Patent Number: 5,605,373
[45] Date of Patent: Feb. 25, 1997

[54] AUTOMOTIVE SEAT COVER ATTACHMENT ARRANGEMENT

[75] Inventors: William J. Wildern, IV, Farmington Hills; Michael J. Twork, Clarkston; Jared E. Collinge, Jr., Royal Oak, all of Mich.

[73] Assignee: General Motors Corporation, Detroit, Mich.

[21] Appl. No.: 517,391

[22] Filed: Aug. 21, 1995

[51] Int. Cl.$^6$ ................................................ A47C 31/00
[52] U.S. Cl. ................................. 297/218.4; 297/452.6; 297/218.3; 5/472
[58] Field of Search ....................... 297/218.4, 218.3, 297/452.6; 5/470, 471, 472, 481

[56] References Cited

U.S. PATENT DOCUMENTS

| | | |
|---|---|---|
| 3,233,253 | 2/1966 | Cauvin . |
| 3,630,572 | 12/1971 | Homier . |
| 3,632,164 | 1/1972 | Radke ............................... 297/452.6 |
| 3,722,950 | 3/1973 | Harnick . |
| 3,727,980 | 4/1973 | Tischler ............................. 297/452.6 |
| 3,794,378 | 2/1974 | Haslam et al. . |
| 3,807,800 | 4/1974 | Morrison et al. . |
| 3,961,823 | 6/1976 | Caudill, Jr. . |
| 3,972,093 | 8/1976 | Aimar ..................................... 5/472 X |
| 4,317,591 | 3/1982 | Ramsey . |
| 4,558,905 | 12/1985 | Natori ................................. 297/452.6 |
| 4,579,389 | 4/1986 | Shimbori et al. .................... 297/452.6 |
| 4,606,580 | 8/1986 | Yoshizawa ........................... 297/452.6 |
| 4,609,226 | 9/1986 | Yoshizawa . |
| 4,718,718 | 1/1988 | Maruyama ....................... 297/451.6 X |
| 4,834,451 | 5/1989 | Meunier et al. . |
| 5,338,098 | 8/1994 | Ohnishi .............................. 297/452.6 |

FOREIGN PATENT DOCUMENTS

| | | |
|---|---|---|
| 125598 | 11/1984 | European Pat. Off. ............ 297/218.3 |
| 0252783 | 1/1988 | European Pat. Off. . |
| 2486922 | 1/1982 | France ................................. 297/452.6 |
| 2928473 | 1/1981 | Germany . |
| 3212569 | 10/1983 | Germany . |
| 3212568 | 10/1983 | Germany . |
| 3737878 | 5/1988 | Germany . |
| 4219943 | 2/1993 | Germany . |
| 6-285275 | 10/1994 | Japan . |
| 6-277376 | 10/1994 | Japan . |

Primary Examiner—Peter M. Cuomo
Assistant Examiner—Rodney B. White
Attorney, Agent, or Firm—Ernest E. Helms

[57] ABSTRACT

An automotive vehicle seat cushion is provided including a resilient body with a top surface and a bottom surface and a multi-dimensional bore intersecting the top and bottom surfaces, the bore having a shoulder juxtaposed between the top and bottom surfaces; a membrane cover for covering at least a portion of the top surface of the resilient body and having connected thereto a rod extending generally parallel to the top surface; and a retainer which has a base adjacent the resilient body bore shoulder, a hook extending from the base with an opening toward the resilient body bottom surface, and a guide for aligning the cover rod to a location between the guide and the hook to capture the rod and thereby retain the cover to the resilient body.

6 Claims, 2 Drawing Sheets

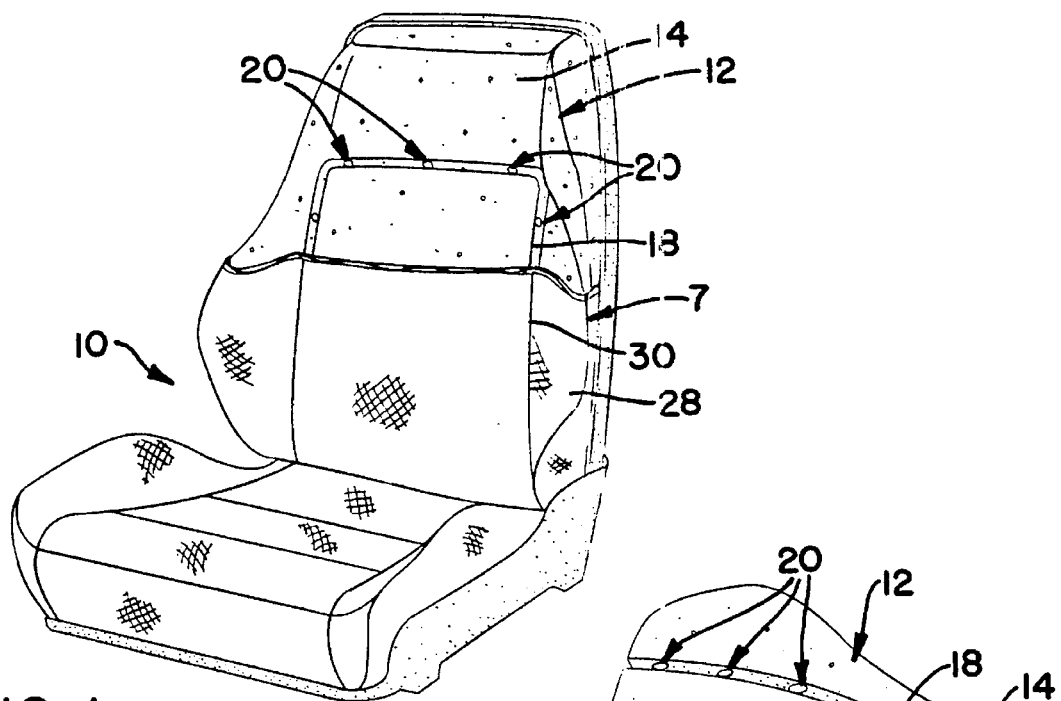
FIG. 1
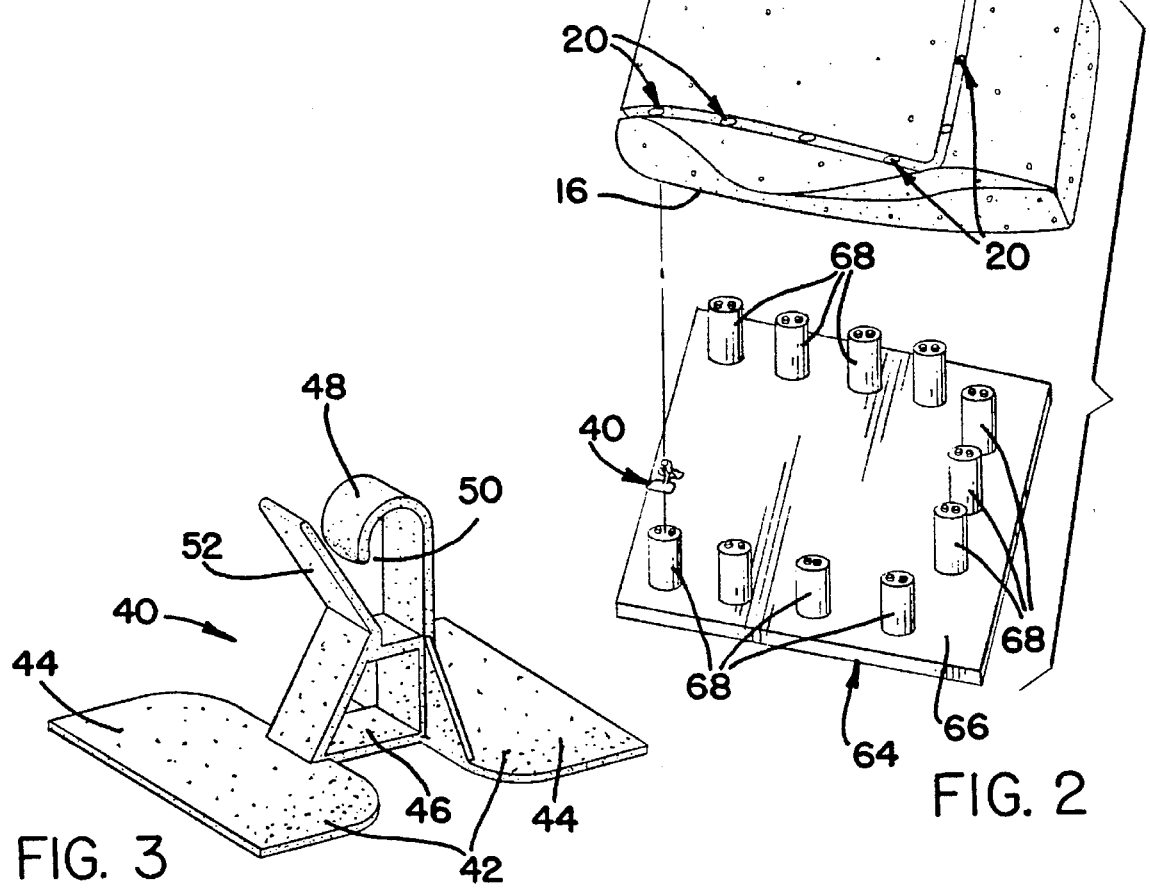
FIG. 2
FIG. 3

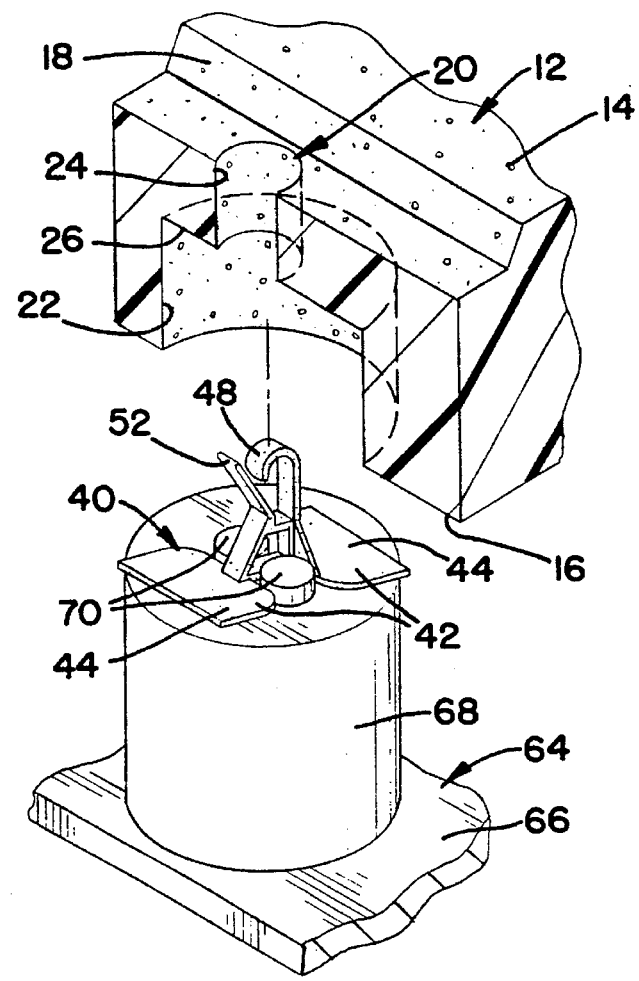
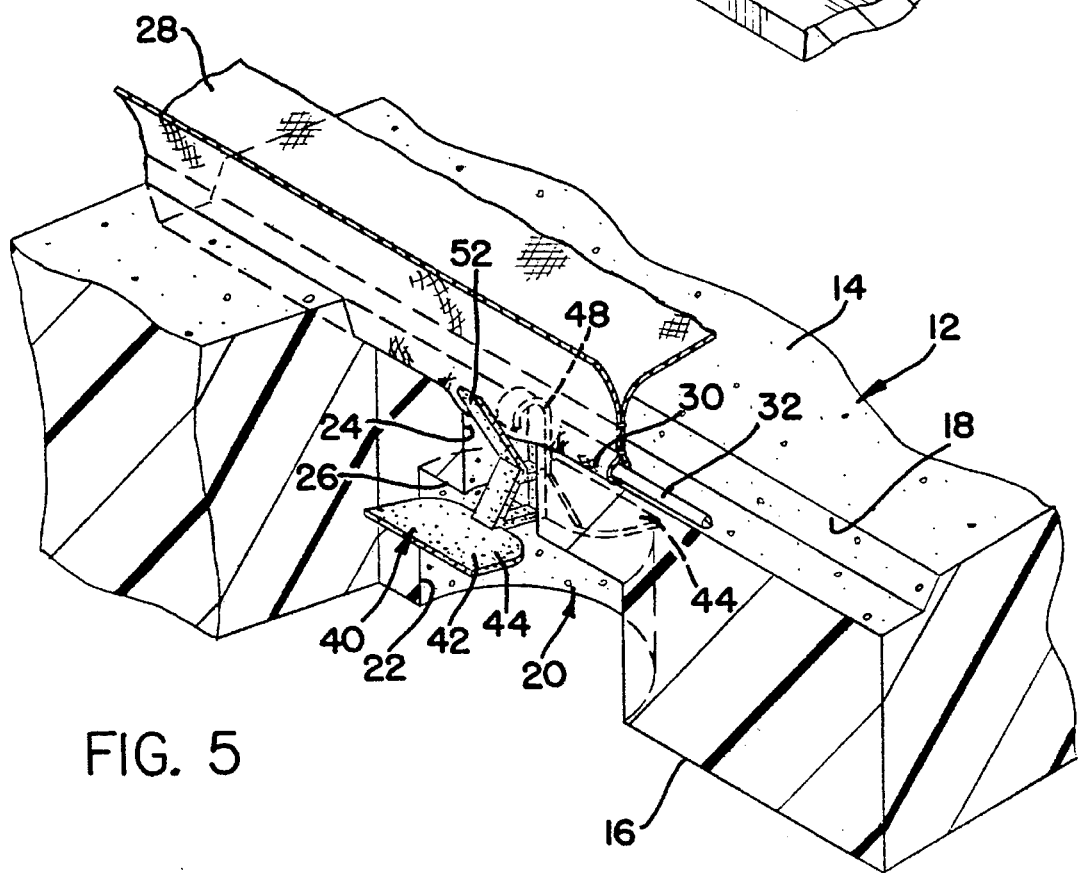

AUTOMOTIVE SEAT COVER ATTACHMENT ARRANGEMENT

FIELD OF THE INVENTION

The field of the present invention is that of automotive vehicle seats and, more particularly, methods of attaching a cover to an automotive vehicle seat cushion.

BACKGROUND OF THE INVENTION

There are three major methods of attaching a fabric, plastic or leather seat trim cover to an automotive vehicle seat resilient body typically made from an expanded polymeric foam. The first method is to embed wires within the resilient body. A C-shaped metal piece is wrapped around the wire embedded in the foam and is also threaded into the opening between a cord sewn on the inside of the cover. A closure device compresses the C-shaped connector, closing it, thereby entrapping the cord with the embedded wire and fastening the trim cover to the resilient body. This technique is often referred to as the hog ring method.

A second major technique is to utilize a hook and loop type fastener attachment where embedded strips of hooks will engage with a series of loops. Typically, the hooks will be embedded within the foam, and a series of strips of loops will be sewn to the inside trim cover.

A third major method of attaching a seat cover to the trim is the utilization of adhesive.

SUMMARY OF THE INVENTION

The present invention provides an alternative to the above-noted methods. Additionally, it provides a fastener system which may be easily removed from the resilient material after utilization, enhancing the capability of recyclability of the resilient material.

BRIEF DESCRIPTION OF THE DRAWINGS

FIG. 1 is a perspective view, partially sectioned, of a vehicle seat utilizing a preferred embodiment seat cushion of the present invention as a seat back.

FIG. 2 is an exploded view demonstrating the assembly of the seat cushion of the present invention shown in FIG. 1 with a retainer piece placed over a locating fixture before placement of a resilient foam body.

FIG. 3 is an enlarged perspective view of the retainer shown in FIG. 2.

FIG. 4 is an enlarged exploded view of the seat cushion shown in FIG. 2 providing additional details of the resilient foam body.

FIG. 5 is a view illustrating connection of the seat cover to the seat cushion by virtue of the present invention.

DESCRIPTION OF THE PREFERRED EMBODIMENT

Referring to FIGS. 1–5, an automotive vehicle seat 10 has a seat cushion back 7 fabricated according to the present invention. The seat cushion 7 has a resilient foam body 12 typically comprised of a polyurethane expanded foam, although other suitable materials may be utilized. The resilient body has a top surface 14 and a bottom surface 16. Additionally, the top surface 14 has a channel 18 which is generally 15 to 25 mm from the top surface 14.

Intersecting the top surface 14 and the bottom surface 16 is a multi-dimensional bore or opening 20 having a large diameter portion 22 and a smaller diameter portion 24 which also intersects the channel 18. Juxtaposed between the top surface 14 and the bottom surface 16 is a bore shoulder 26. The height from the shoulder 26 to the bottom surface 16 will vary depending on the foam thickness, and the height from the shoulder 26 to the top of channel 18 will typically be 10 mm. Also, the diameter or size of portion 22 will typically be of a size to accommodate a retainer base 42, and the diameter of the upper bore will typically be 12 mm.

Placed over a large portion, if not all, of the resilient body 12 is a cover 28. The cover 28 has a sewn formed pocket 30 and entrapped therein will be a rod 32. The rod 32 is typically a polymeric material such as polyethylene having a thickness of 2 to 3 mm or may be a paper cord. In an embodiment not shown, the rod may simply be a portion of the fabric cover which is compressed to form a linear object or a plastic piece extruded onto an end of a fabric membrane which is integrally or non-integrally connected to the cover 28. The rod extends generally parallel to the top surface 14 of the resilient body.

Placed within multi-dimensional bore 20 of the resilient body is a plastic retainer 40. The retainer 40 has a double-leaf base 42 having leaves 44 connected by a cross member 46. Extending generally upward toward the top surface 14 from the base 42 is a hook 48 having an opening 50 which is directed toward the resilient body bottom surface 16. Lateral to the hook is an upwardly extending guide member 52 typically inclined at an angle between 40 degrees and 70 degrees with the base 42.

An assembly fixture 64 has a base 66 with a plurality of columns 68. The diameter of the columns 68 is typically slightly less than the diameter of portion 22 of the bore 20. The column 68 also has two studs 70 which fit within a spacing between the leaves 44 and capture the retainer 40 about the lower cross member 46. The retainers 40 are positioned such that the guide 52 is toward the outer periphery of the channel 18. The resilient body 12 is then dropped over the retainers 40. The resilient body will drop to the point where the retainer base 42 is generally adjacent to the shoulder 26. At this time, the top of the retainer hook 48 will be approximately 3 to 4 mm above the channel 18. The cover 28 will be placed over the top surface 14 of the resilient body, causing the rod 32 to impinge upon the guide member 52, flexing the guide member leftward as shown in FIGS. 3 through 5 to deflect until such time that the rod is entrapped between the guide 52 and the hook 48 of the retainer. It has been found that this method of attachment typically provides a retention force of 29N per retainer 40.

An advantage of the present invention is that upon scrapping of the automobile, the cover 28 may be removed from the resilient foam body 12 by simply twisting the retainer 40 from the rear of the seat cushion back 7, causing the hook portion 48 of the retainer to be deformed or for the rod to twist out from between the hook 48 and the guide 52. The retainer 40 may then be removed by hand, allowing the entire resilient body to proceed to a recycling center free of any impurities from scraps of connector pieces or chemical impurities added by an adhesive process.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive vehicle seat cushion comprising:

a resilient body having a top surface and a bottom surface and a multi-dimensional bore intersecting the top and bottom surfaces, the bore having a shoulder juxtaposed between the top and bottom surfaces;

a membrane cover for covering at least a portion of the top surface of the resilient body, the cover having connected thereto a rod extending generally parallel to the top surface; and a retainer, the retainer having a generally planar base adjacent and contacting the resilient body bore shoulder, the retainer having a hook extending upwardly and perpendicularly from the base through the bore of the resilient body, the retainer hook having an opening toward the resilient body bottom surface, and the retainer having a guide generally extending upwardly toward the resilient body top surface, the guide generally aligning the cover rod to a location between the guide and the retainer hook to capture the rod within the retainer hook and thereby retaining the cover to the resilient body.

2. An automotive vehicle seat cushion as described in claim 1 wherein the retainer is fabricated from a polymeric material.

3. An automotive vehicle seat cushion as described in claim 1 wherein the guide is inclined with respect to the base and extends generally between 40 degree and 70 degree angles.

4. An automotive vehicle seat cushion as described in claim 1 wherein the rod is positioned within a sewn pocket of the cover.

5. An automotive vehicle seat cushion as described in claim 1 wherein the rod extends within a channel of the top surface of the resilient body.

6. An automotive vehicle seat cushion comprising:

a resilient foam body having a top surface and a bottom surface and a multi-dimensional bore intersecting the top and bottom surfaces, the bore having a shoulder juxtaposed between the top and bottom surfaces and the resilient body having a channel intersecting the bore running along the top surface of the resilient body;

a membrane cover for covering the top surface of the resilient body, the cover having connected thereto a rod extending generally parallel to the top surface positioned within the channel of the resilient body being positioned within a sewn pocket formed in the cover; and a retainer, the retainer having a generally planar base adjacent and contacting the resilient body bore shoulder, the retainer having a hook extending upwardly and perpendicularly from the base through the bore of the resilient body, the retainer hook having an opening toward the resilient body bottom surface, and the retainer having a guide generally extending upwardly toward the resilient body top surface, the guide generally aligning the cover rod to a location between the guide and the retainer hook to capture the rod within the retainer hook and thereby retaining the cover to the resilient body.

\* \* \* \* \*